United States Patent
Di Leo

(10) Patent No.: US 12,419,406 B2
(45) Date of Patent: Sep. 23, 2025

(54) ARTICULATING TOOL SUPPORT

(71) Applicant: Alessandro Di Leo, Van Nuys, CA (US)

(72) Inventor: Alessandro Di Leo, Van Nuys, CA (US)

(*) Notice: Subject to any disclaimer, the term of this patent is extended or adjusted under 35 U.S.C. 154(b) by 101 days.

(21) Appl. No.: 18/435,878

(22) Filed: Feb. 7, 2024

(65) Prior Publication Data

US 2024/0292939 A1 Sep. 5, 2024

Related U.S. Application Data

(60) Provisional application No. 63/449,922, filed on Mar. 3, 2023.

(51) Int. Cl.
| | | |
|---|---|---|
| *A45F 3/14* | (2006.01) | |
| *A45F 3/04* | (2006.01) | |
| *F16M 13/04* | (2006.01) | |
| *A45F 3/00* | (2006.01) | |

(52) U.S. Cl.
CPC ............... *A45F 3/14* (2013.01); *A45F 3/04* (2013.01); *F16M 13/04* (2013.01); *A45F 2003/003* (2013.01); *A45F 2003/146* (2013.01)

(58) Field of Classification Search
CPC ........ A45F 3/14; A45F 3/04; A45F 2003/003; A45F 2003/146; F16M 13/04; F16M 3/08; F16M 3/10
USPC .......................................... 224/201; 396/420
See application file for complete search history.

(56) References Cited

U.S. PATENT DOCUMENTS

| | | | | |
|---|---|---|---|---|
| 3,964,182 | A * | 6/1976 | Pomeret | E02F 3/02 224/907 |
| 4,037,763 | A * | 7/1977 | Turchen | F16M 13/00 280/30 |
| 4,206,983 | A * | 6/1980 | Nettman | F16M 11/2028 396/421 |
| 4,685,649 | A * | 8/1987 | McKay | F16M 11/24 352/243 |
| 8,657,507 | B2 * | 2/2014 | Di Leo | F16M 13/04 396/420 |
| 8,985,878 | B2 * | 3/2015 | Di Leo | F16M 11/2042 396/422 |
| 10,401,713 | B2 * | 9/2019 | Teichman | F16M 11/2021 |
| 2010/0266270 | A1 * | 10/2010 | Pizzo | G03B 17/00 396/420 |

* cited by examiner

*Primary Examiner* — Nathan J Newhouse
*Assistant Examiner* — Lester L Vanterpool
(74) *Attorney, Agent, or Firm* — Fulwider Patton LLP

(57) ABSTRACT

A rig for supporting a tool that comprises webbing configured to be attached to a vertically oriented torso of a person. A rigid frame is attached to the webbing. A first connector is attached to the frame and configured in relation to the frame such that the first connector may swivel about a first elongate axis, whereby the first connector does not move further from, or closer to, the frame shaft when the first connector swivels about the first elongate axis. A first articulation piece having a first end and a second end opposite the first end is provided. The first end is attached to the first connector, and the first connector is configured in relation to the articulation piece so that the articulation piece may pivot about the first connector, whereby the articulation piece moves closer to, alternatively further from, the frame shaft when the articulation piece pivots.

5 Claims, 10 Drawing Sheets

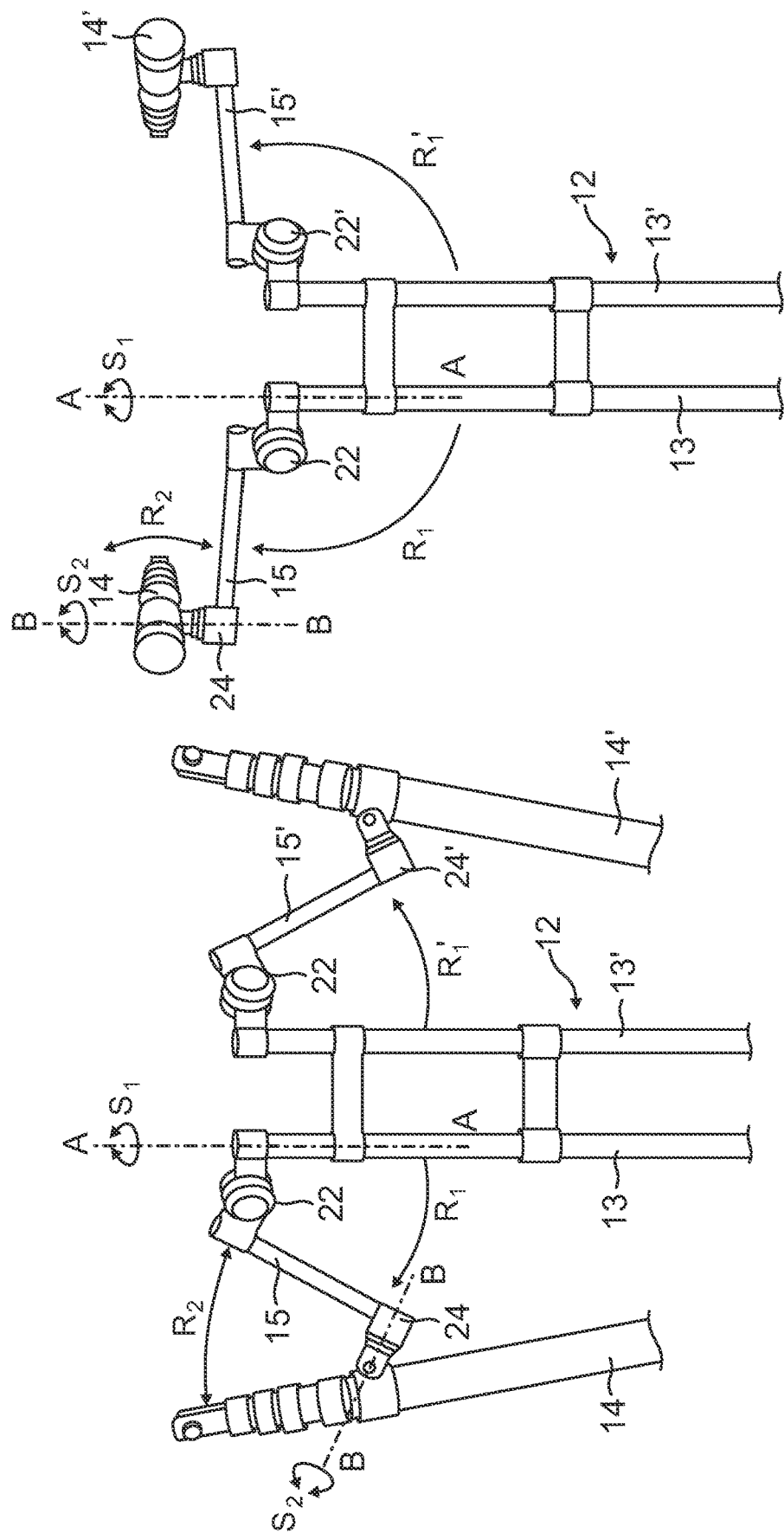

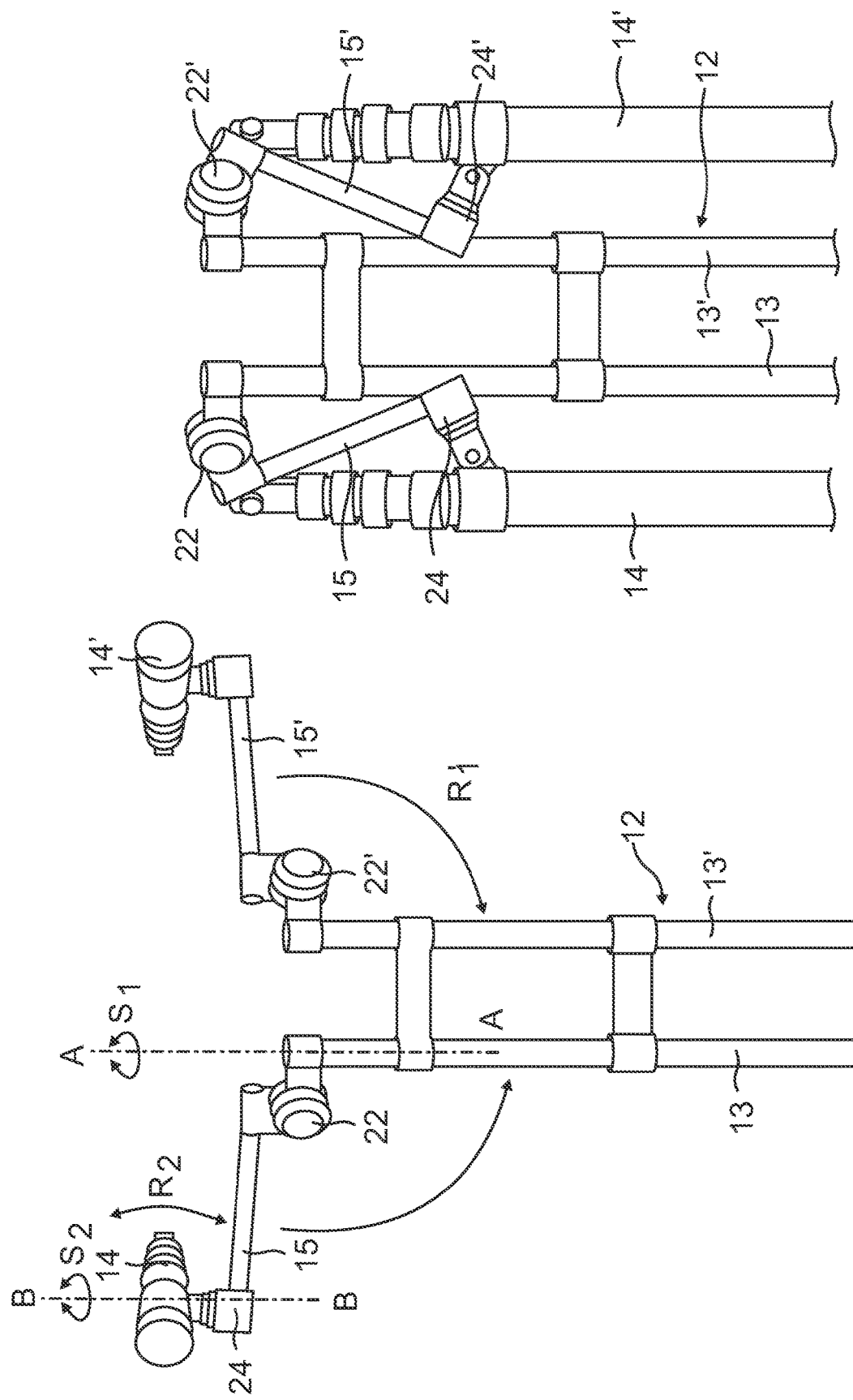

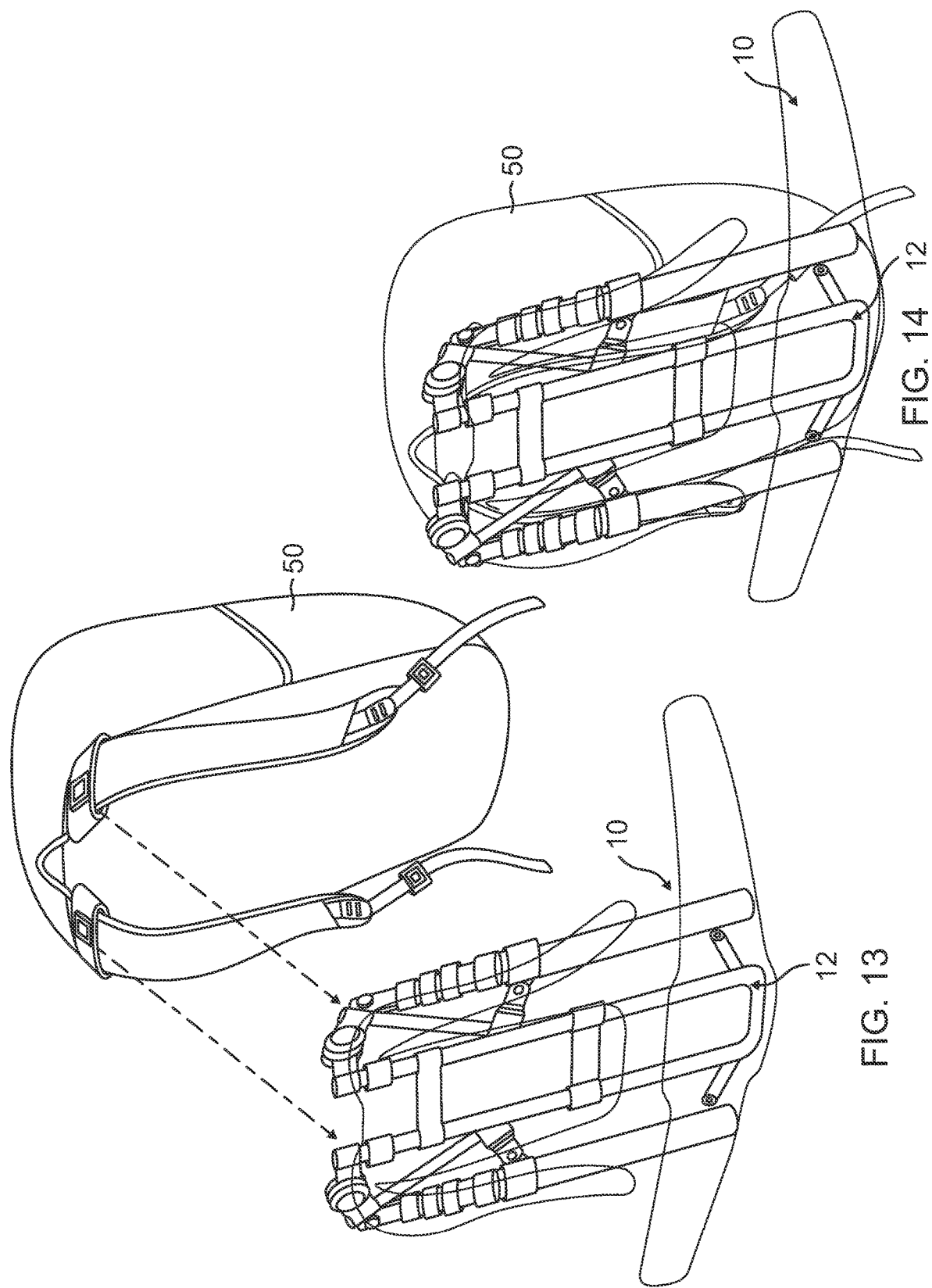

ARTICULATING TOOL SUPPORT

CROSS-REFERENCES TO RELATED APPLICATIONS

This is application which claims priority to U.S. Ser. No. 63/449,922, filed Mar. 3, 2023, the contents of which is incorporated by reference herein in its entirety.

FIELD OF THE INVENTION

The present invention relates to a system and method for tool stabilization for a worker who is supporting a tool suspended from a frame that is attached to his torso.

BACKGROUND

It is known how to support a camera from the body of a cameraman in order to stabilize the camera and facilitate its movement by hand. An example of such a system and method is found in the co-owned U.S. Pat. No. 8,657,507 which is incorporated herein by reference in its entirety. The present invention relates to the suspension of tools in general, and the term "tool" is here defined to include a camera and a firearm; and the term "camera" is defined to include any tool or firearm in general.

The presently described invention is a novel system and method that addresses new problems and needs in the art.

The terms "rig," "tool support," and "support system" are used herein interchangeably.

SUMMARY OF THE INVENTION

In a preferred embodiment, the invention is a support system, or rig, for supporting a tool being used by a workman. The rig comprises webbing configured to be attached to a vertically oriented torso of a person. A rigid frame is attached to the webbing, wherein the rigid frame includes a frame shaft that is oriented vertically and has a first elongate axis. A first connector, is attached to the frame shaft and configured in relation to the frame shaft such that the first connector may swivel about the first elongate axis, whereby the first connector does not move further from, or closer to, the frame shaft when the first connector swivels about the first elongate axis. A first articulation piece having a first end and a second end opposite the first end is provided. The first end is attached to the first connector, and the first connector is configured in relation to the articulation piece so that the articulation piece may pivot about the first connector, whereby the articulation piece moves closer to, alternatively further from, the frame shaft when the articulation piece pivots about the first connector. A second connector is attached to the second end of the articulation piece, wherein the second connector is configured in relation to the articulation piece so that the second connector is fixed to the articulation piece and may not rotate in relation to the articulation piece. An arm having a proximal end and a distal end opposite the proximal end is provided, wherein the arm, at a point of attachment adjacent the proximal end, is attached to the second connector. The second connector is configured in relation to the arm so that the arm may swivel about a second axis of the second connector, the second axis being perpendicular to the articulation piece and passing through the point of attachment with the arm, whereby swivel movement of the arm about the second axis allows an angle between the arm and the articulation piece (seen from vertically above the deployed rig) to be varied. Additionally, the second connector is further configured in relation to the arm so that the arm may pivot about the second connector in a plane that includes the arm, whereby the arm, when swiveled to lie in the same plane as the articulating piece, may be pivoted to move closer to, alternatively further from, the articulation piece. Under this configuration, the rig may assume configurations, including, in which the articulation piece may be oriented vertically, alternatively, horizontally, and, further whereby, the arm may be oriented vertically, alternatively, horizontally.

In further embodiments, the first connector is configured to allow an angle of rotation to be selected and locked, alternatively, unlocked as desired. In yet further embodiments, the rig may further comprise a cover attached to the webbing, the cover being configured to conceal the frame, the articulation piece, and the arm, when in the collapsed condition. In yet further embodiments, the rig further comprises a backpack configured to attach to the webbing on the outside of the cover.

In another embodiment, the rig may further include a second articulation piece, wherein the first articulation piece is positioned on a first hand side of the rigid frame, and the second articulation piece is positioned on a second hand side of the rigid frame opposite the first hand side, further wherein, the second articulation piece has a first end and a second end opposite the first end, wherein the first end is attached to a third connector, and the third connector is configured in relation to the second articulation piece so that the second articulation piece may pivot about the third connector, whereby the articulation piece moves closer to, alternatively further from, the rigid frame when the second articulation piece pivots about the third connector.

These and other advantages of the invention will be best understood when read in conjunction with the description of the figures, and the detailed description of the invention.

DETAILED DESCRIPTION OF THE DRAWINGS

FIG. 5 is a partial view showing the tool support of FIG. 3 in a third partially deployed condition.

FIG. 6 is a partial view showing the tool support of FIG. 3 in the first fully deployed condition.

FIG. 7 is a partial view showing certain details of the tool support of FIG. 6, before being returned to the first condition.

FIG. 8 shows the tool support of FIG. 3, returned to the second folded condition.

FIG. 13 shows details of a tool support of the present invention in conjunction with a webbing for enclosing the tool support, and a backpack for attachment to the webbing.

FIG. 14 shows a tool support of the invention, webbing, and a bag packed together

DESCRIPTION OF THE PREFERRED EMBODIMENTS

Figure 1:
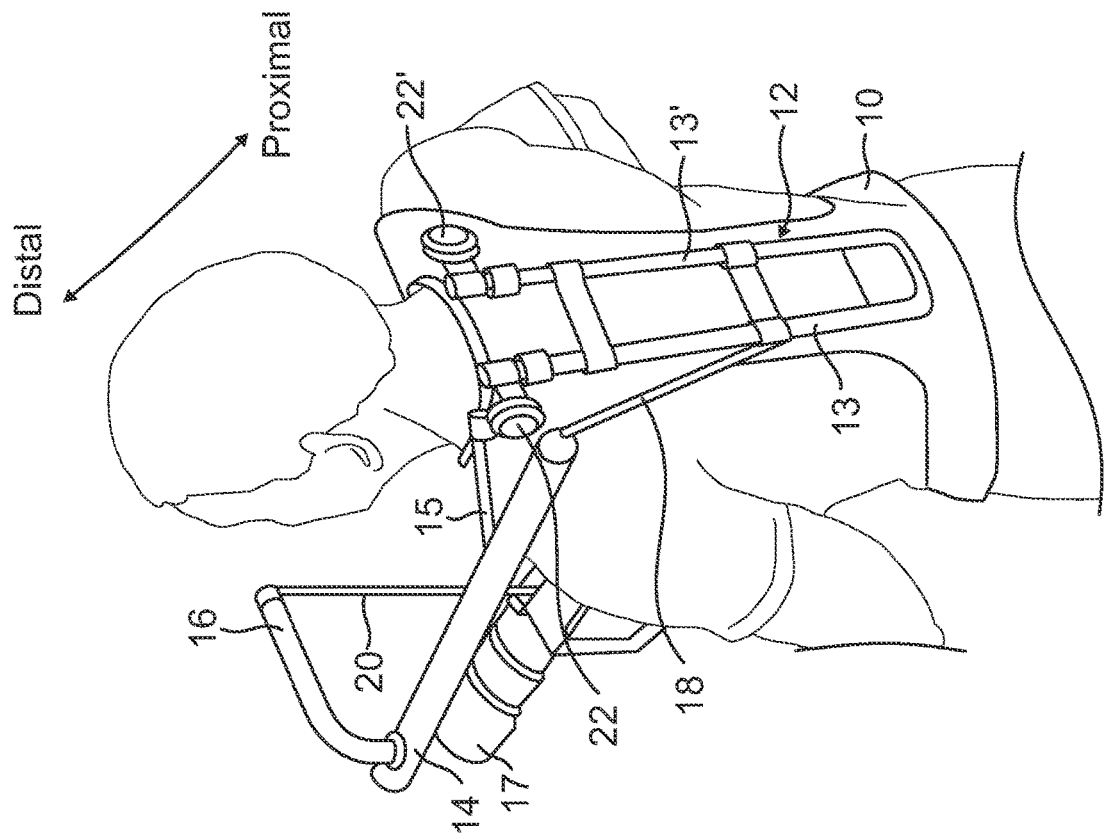
FIG. 1 shows a first embodiment of the tool support of the present invention in a first condition, secured onto the back and shoulders of a user.

In the following detailed description, certain preferred embodiments are described in order to provide a thorough understanding of the present invention.

The invention comprises, in different embodiments, a tool support system for stabilizing a tool that is being used by a worker or "toolman."

Overview of the Structures of the Embodiments.

In a first embodiment (best seen in FIGS. 1 & 2) the tool support of the invention comprises a webbing 10 which may be strapped to the back and shoulders of a user. Included in and attached to the webbing is a rigid vertical frame 12 for supporting elements of the tool support. The term "vertical" is used in the ordinary sense, which implies that the frame 12, when strapped on with the webbing, extends in the same direction as the vertical torso of the user. "Horizontal" is used to refer to an object that is horizontal in the ordinary sense, parallel with the horizon and perpendicular to the vertical. An object of the first embodiment is to provide a single arm that extends horizontally over one shoulder of a user. From a distal end of the arm there may be attached a suspension system 16, 20 configured to provide support for a tool 17 being used by the user. The suspension system allows the user to let go of the tool and use his hands for other tasks, and then to return to using the tool. Additionally, the suspension system may assist the user by carrying a proportion of the tool load, thus relieving the user of the full load but not all of the load.

In a second embodiment (best seen in FIGS. 3-8), a mirror image (imaged about a line drawn vertically through the middle of the user's torso) of the first embodiment is provided and added to the tool support. The second embodiment provides for redundancy over the first embodiment and its additional elements follow the same principles as the elements of the first embodiment. Accordingly, the elements added by the second embodiment on the right side mirror image all have the same reference numeral as the left side, but are distinguished by a "dash" so that, for example, arm 14 and arm 14' are left and right mirror images of each other.

Turning now to a detailed description of the first embodiment: Because the second embodiment includes a mirror image of the first embodiment, figures depicting the second embodiment will be used to describe the first embodiment where they have greater clarity but it will be understood that the first embodiment is being described.

Starting by reference to FIG. 6, which shows a partial image of the invention in a deployed condition, the relationship between certain elements of the invention are shown.

Attached as part of the frame 12 is a vertical shaft 13 with an elongate axis A-A, as seen in FIG. 6. The shaft 13 is held substantially immovable in relation to the webbing 10 attached to the user's torso. Adjacent the upper end of the shaft 13, a first connector 22 is attached to the shaft and is configured in relation to the shaft such that the first connector may swivel (see arrow marked as S1 in FIGS. 5-6) about the elongate axis A-A. When the first connector swivels about the first elongate axis A-A the first connector does not move further from, or closer to, the frame shaft 13.

The support rig further includes an articulation piece 15 which has a first end and a second end opposite the first end. The first end is attached to the first connector 22, and the first connector is configured in relation to the articulation piece so that the articulation piece may rotationally pivot about the first connector (see arrow marked as R1 in FIGS. 5-6) When the articulation piece 15 pivots about the first connector 22, the articulation piece moves closer to, alternatively further from, the frame shaft 13. This movement may be understood by reference to FIGS. 4-6.

The support rig further includes a second connector 24 attached to the second end of the articulation piece 15. The second connector 24 is configured in relation to the articulation piece 15 such that the second connector is fixed to the articulation piece and may not rotate in relation to the articulation piece.

The support rig further includes an arm 14 having a proximal end and a distal end opposite the proximal end. The arm, at a point of attachment adjacent the proximal end, is attached to the second connector 24. The second connector is configured in relation to the arm such that the arm may swivel (marked as arrow S2 in FIGS. 5-6) about a second axis (marked as B-B in FIGS. 5-6) of the second connector 24, the second axis B-B being perpendicular to the articulation piece and passing through the point of attachment with the arm. The swivel movement (S2) of the arm 14 about the second axis B-B allows an angle between the arm and the articulation piece to be varied. This angle variation may be best understood by considering the view, and the angle between the arm 14 and the articulation piece 15, as seen when looking vertically down the axis B-B from above, in FIG. 6.

The second connector 24 is further configured in relation to the arm 14 so that the arm may rotationally pivot about the second connector 24 in a plane that includes the arm, whereby the arm 14, when swiveled to lie in the same plane as the articulating piece 15 (as depicted in FIG. 5), may be rotationally pivoted (as shown by arrow R2 in FIG. 5) so that the arm moves closer to, alternatively further from, the articulation piece.

Under the structures described above, the rig may assume configurations that include the articulation piece 15 being oriented vertically, alternatively, horizontally, and, further whereby, the arm 14 may be oriented vertically, alternatively, horizontally. This ability to adopt these configurations allows the rig to be compactly stowed on the back of the user, and also expanded to full deployment by which a tool 17 may be suspended in front of the user.

Figure 4:
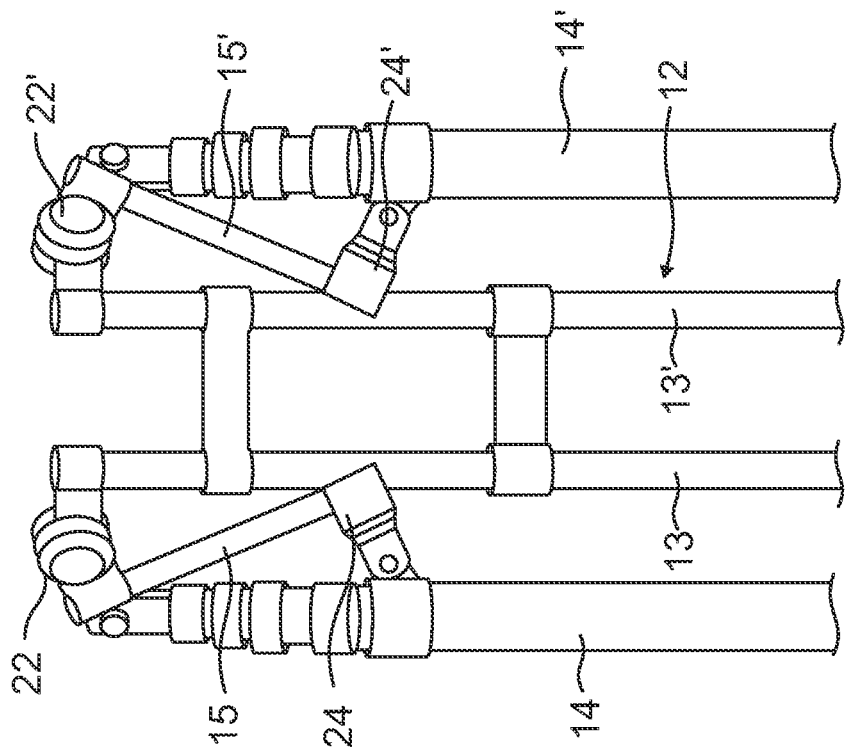
FIG. 4 is a partial view showing the tool support of FIG. 3, in a second folded condition.
Figure 3:
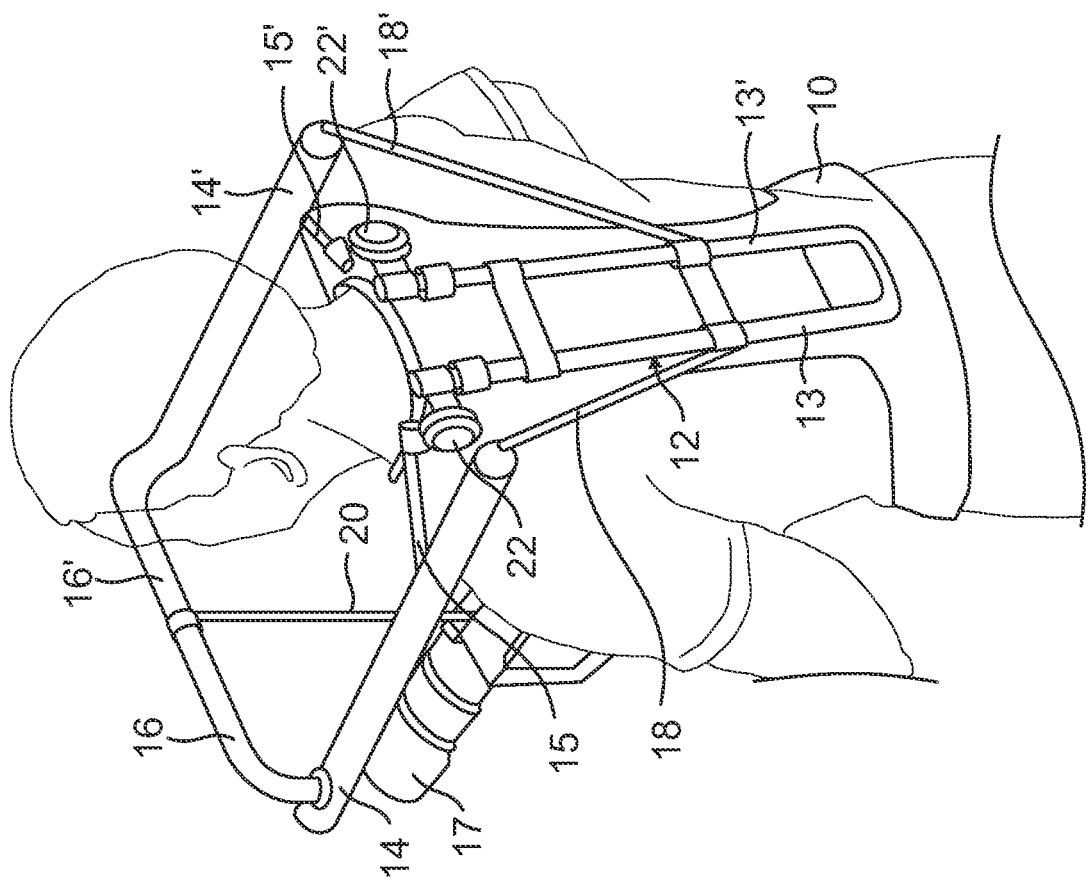
FIG. 3 shows a second embodiment of the tool support of the present invention in a first fully deployed condition.

Additional features of the structure described above may include the following:

The first connector 22 may comprise a rotating release catch 22, of a kind that is known in the art for its ability to prevent rotation in a first "lock" condition, but to allow rotation in second "release" condition. An example of such a release catch is found in U.S. Pat. No. 7,766,429. This feature allows the user to lock a selected horizontal orientation of the articulation piece into deployed position for use (as seen in FIG. 6), until released again. Alternatively, the user may lock the articulation piece 15 into a downwardly extending orientation (as seen in FIG. 4) giving the rig a compact condition for storage.

Elastic Tie 18

Continuing with the description of the invention: As shown in FIGS. 1-3 and 17, at the proximal end of the arm 14 is attached an elastic tie 18, which may be a helical spring, an elastic band, or similar. The tie 18 is attached to a point on the arm adjacent a proximal end of the arm 14, and extends to a point of connection towards the bottom of the frame 12 so that the tie 18 urges the proximal end of the arm to return to a position in which the arm 14 is horizontal over the shoulder of the user.

Figure 2:
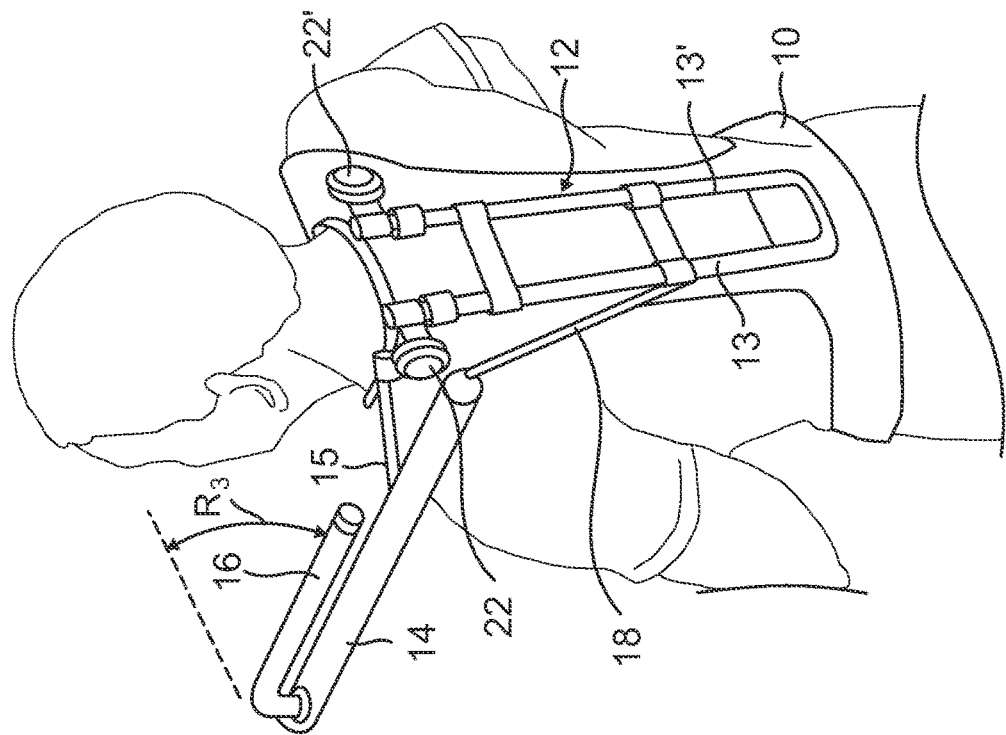
FIG. 2 shows the tool support of FIG. 1, in a second condition.

At the distal end of the arm is attached an L-bracket 16, in the disclosed embodiment, although the bracket may have any shape capable of carrying out the function herein described. As seen in FIGS. 1 & 2, the L-bracket may be rotated (as indicated by R3 in FIG. 1) to extend parallel with and adjacent the arm 14 in a first condition (see FIG. 1) which is useful for storage, and perpendicular to the arm in a second condition (FIG. 2) which is its configuration for use. In the second condition, a support element 20 may suspend downwardly from the L-bracket 16, to allow a tool 17 to be attached to a lower end of the support element 20. The support element may be a tie, or rod, or similar linear element with attachment hooks or other means connected. Under these conditions as shown in FIG. 2, a user may attach and suspend the weight of the tool 17 from the support system while leaving his hands free to manipulate the tool and perform other tasks. In some embodiments, the L-bracket 16 may be attached to the arm 14 via a rotating release catch of a kind similar to the release catch 22.

In the second embodiment of the invention (FIG. 3-FIG. 8), a mirror image arm 14', a mirror image articulation piece 15', a mirror image L-bracket 16' and mirror image tie 18', and so forth, may be added to the structure, so that the user has a left side and a right side support for suspending the tool—but where a single support element 20 is used.

MORE DETAILED DESCRIPTION

FIGS. 4, 5, 6, 7 and 8, show a sequence of conditions that the second embodiment of the support system may follow from storage, to full deployment, and back to storage again.

Starting with FIG. 4 the structure of the support tool is here described in greater detail. In FIG. 4 it is shown how the second embodiment can allow the arms 14, 14' to be oriented to be vertically aligned in a collapsed, or stowed, condition, which may be closely adjacent the frame 12 which, as noted above, is embedded in the webbing 10.

Figure 17:
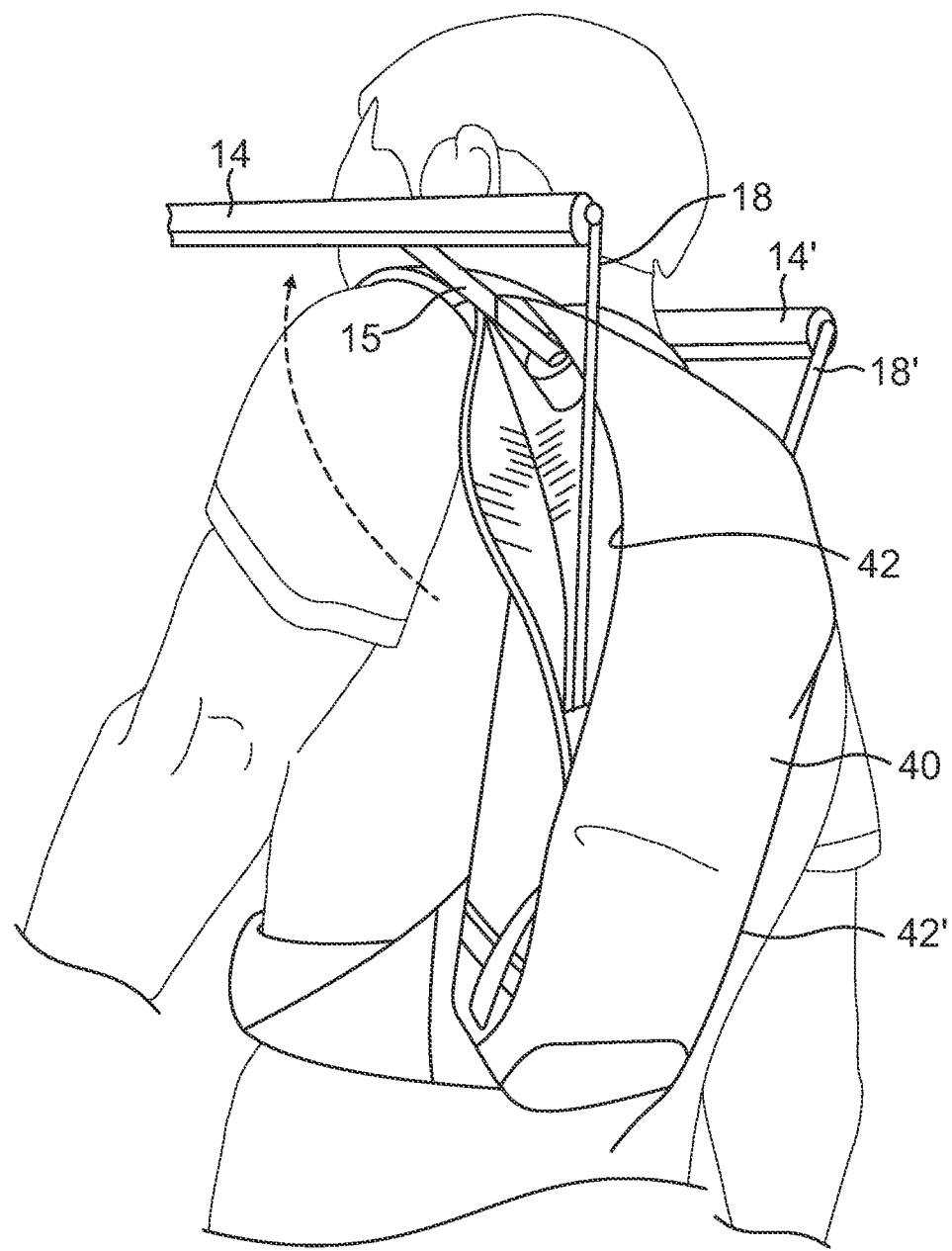
FIG. 17 shows webbing worn on a toolman, from which a tool support is fully deployed.
Figure 19:
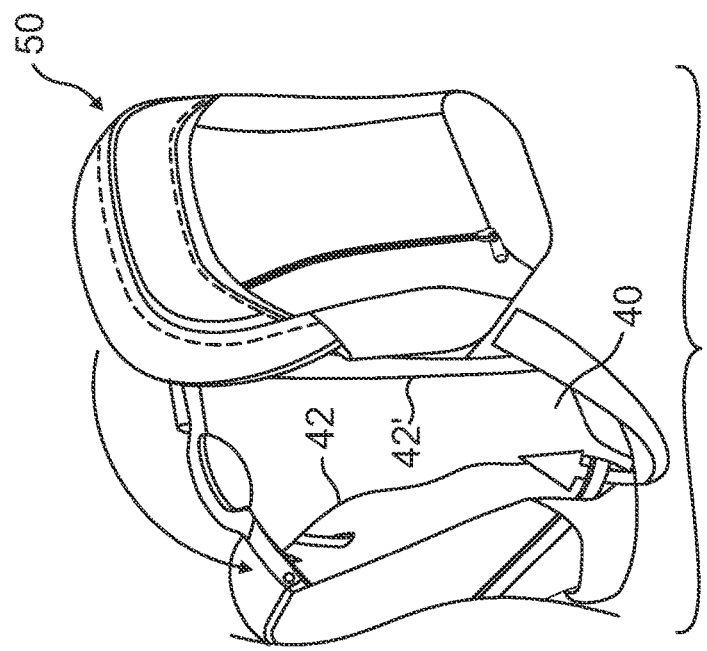
FIG. 19 shows the webbing and backpack shown in FIG. 18 in a condition separated from each other.
Figure 18:
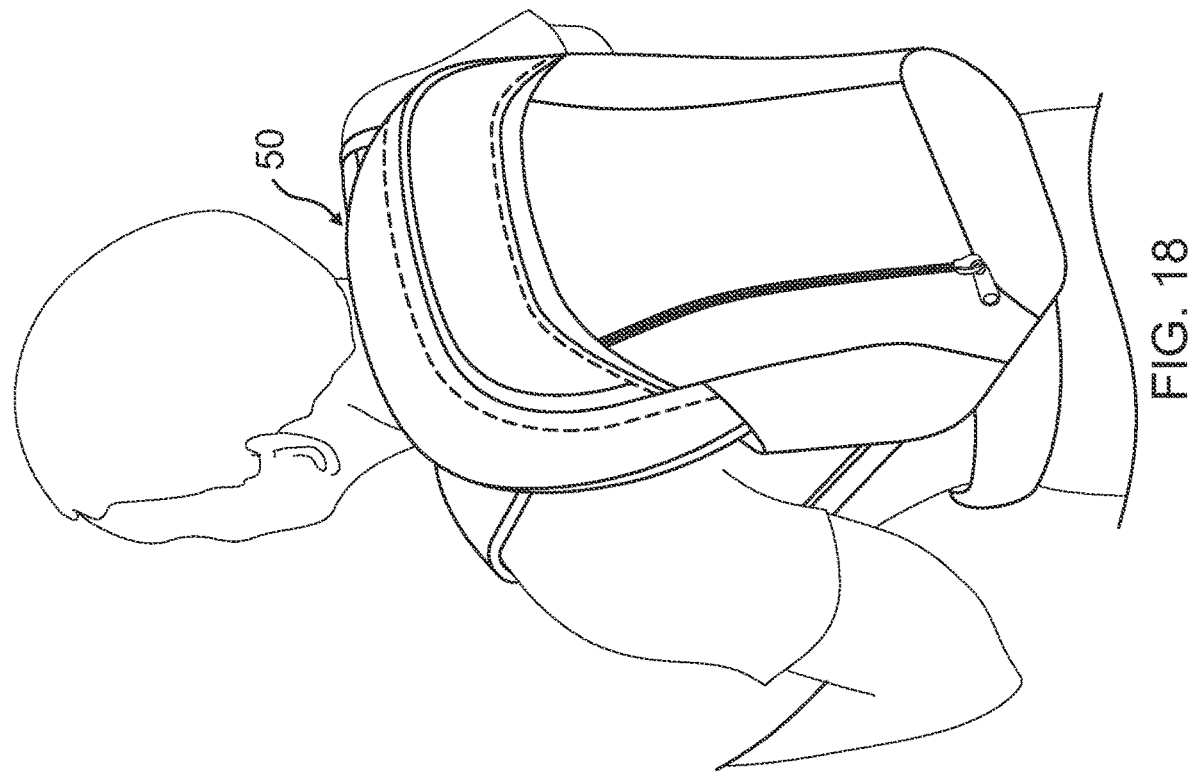
FIG. 18 shows a tool worn on a toolman, with a backpack attached to the webbing.

In this condition, the webbing 10 may include a specially shaped cover 40, with side slots 42 so that when the arms 14, 14' are moved from the collapsed towards the deployed condition, the arms move through the slots 42 from a covered state, to an exposed state. The cover 40 with side slots 42 is best seen in FIG. 17 and it shows how the arms 14, 14' may pop out of the slots 42 in the cover towards the deployed condition.

Figure 10:
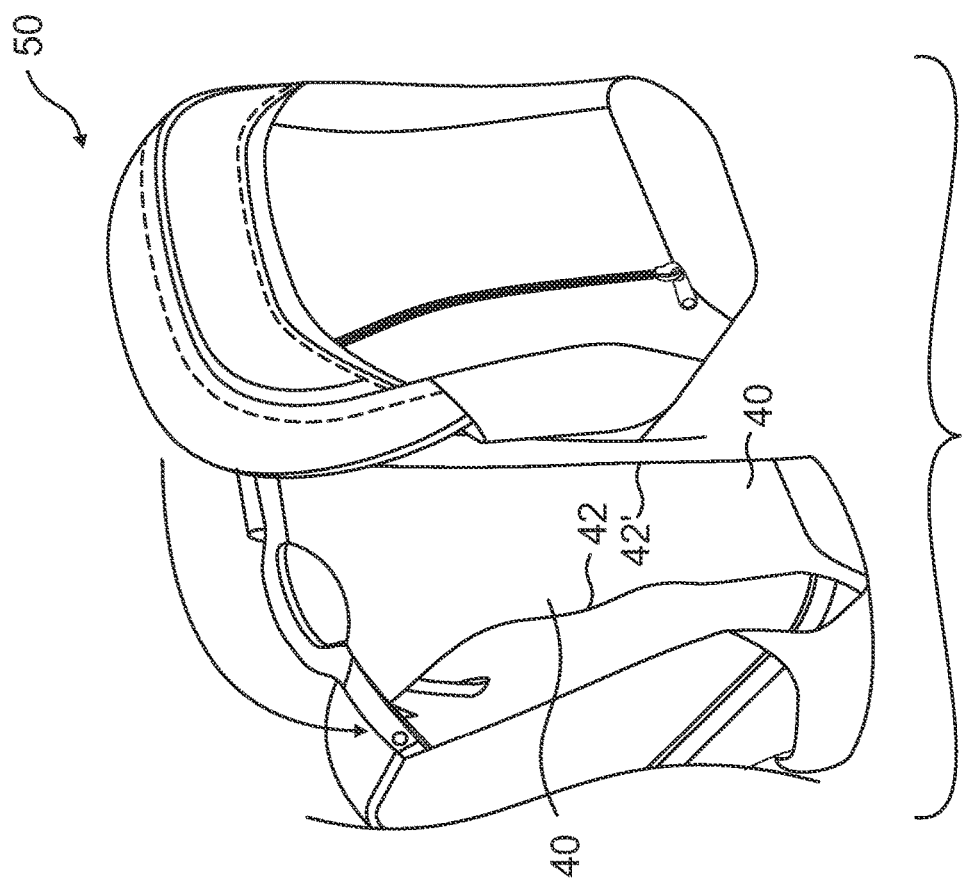
FIG. 10 shows an interface between the webbing and a backpack.
Figure 9:
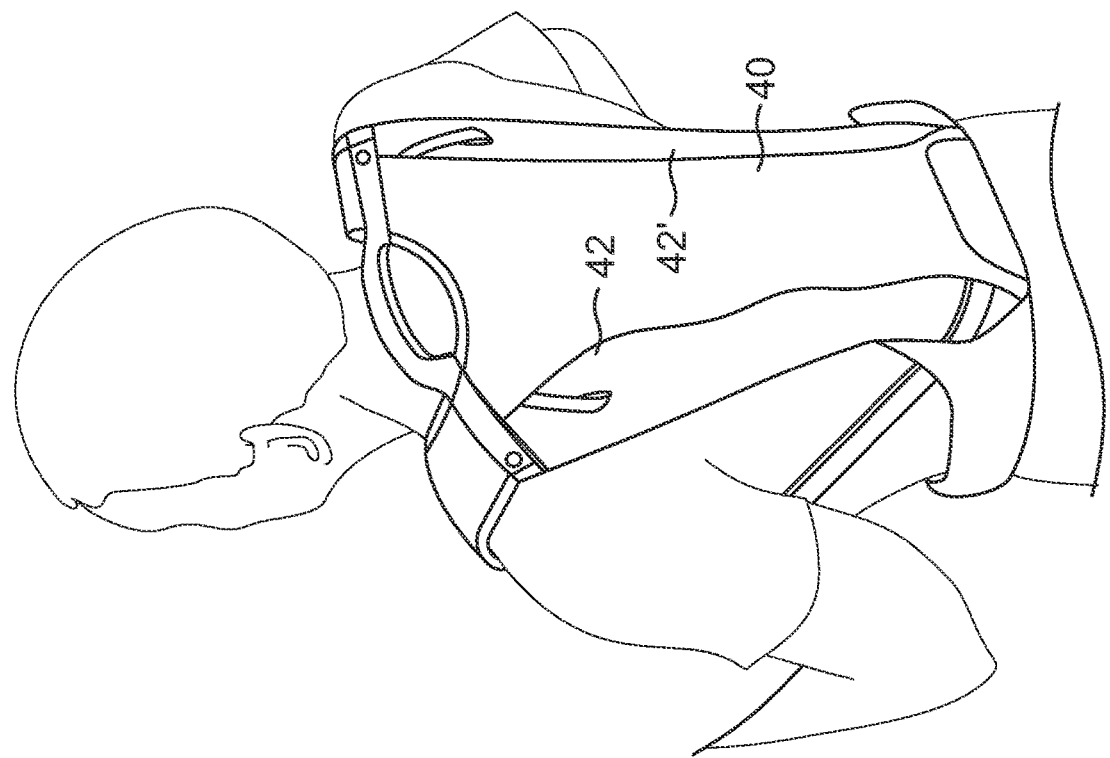
FIG. 9 shows webbing worn on a toolman, suitable for receiving within it the tool support of FIG. 3.
Figure 12:
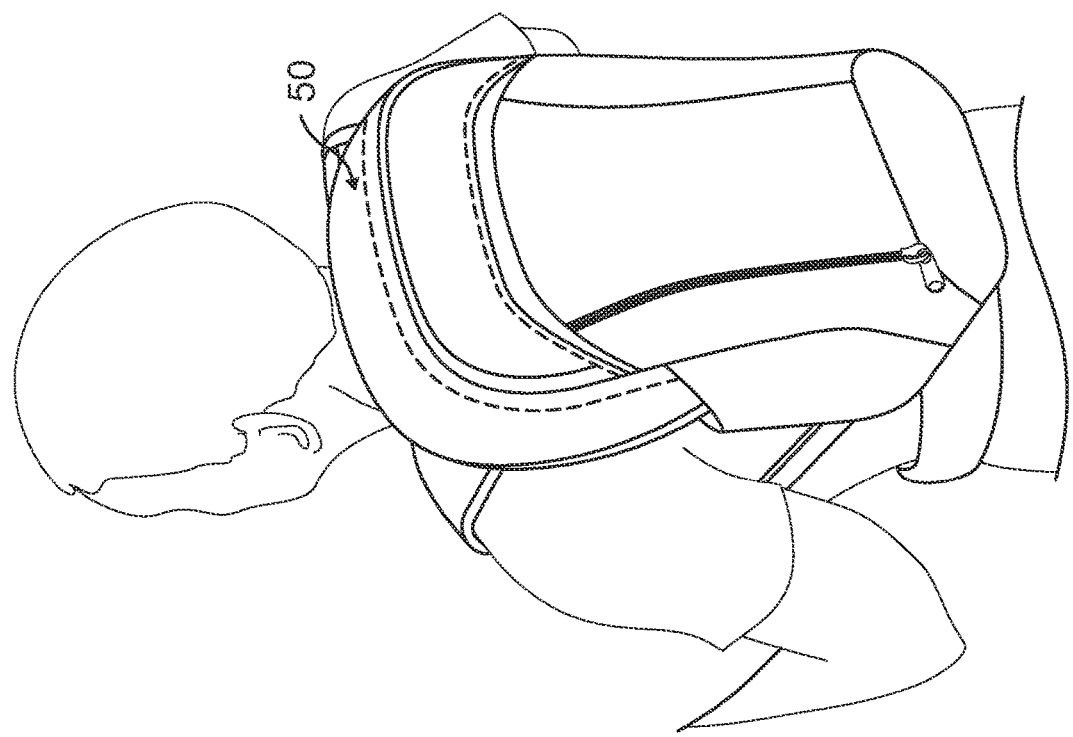
FIG. 12 shows how a toolman may wear a backpack attached to a rear surface of the webbing shown in FIG. 9.
Figure 11:
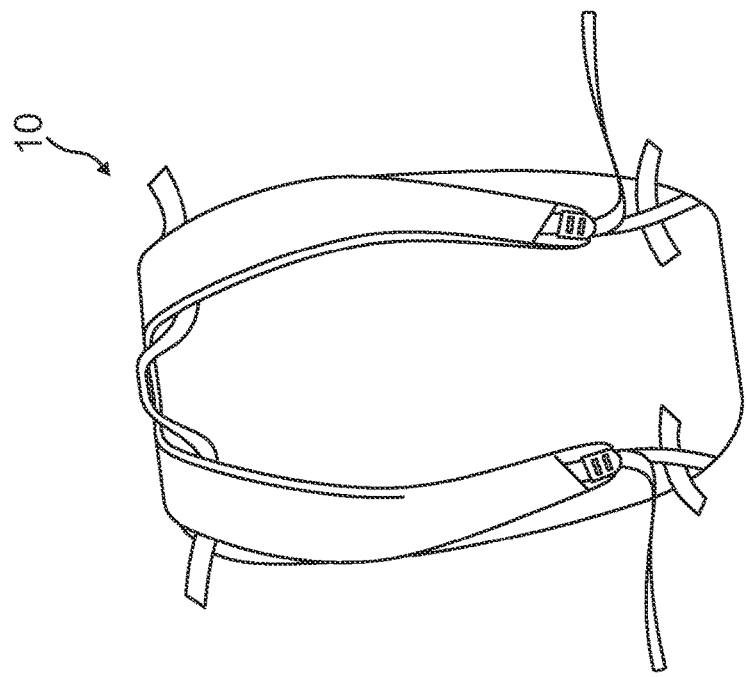
FIG. 11 shows the webbing from the aspect of the surface that comes in contact with the back of the toolman.
Figure 15:
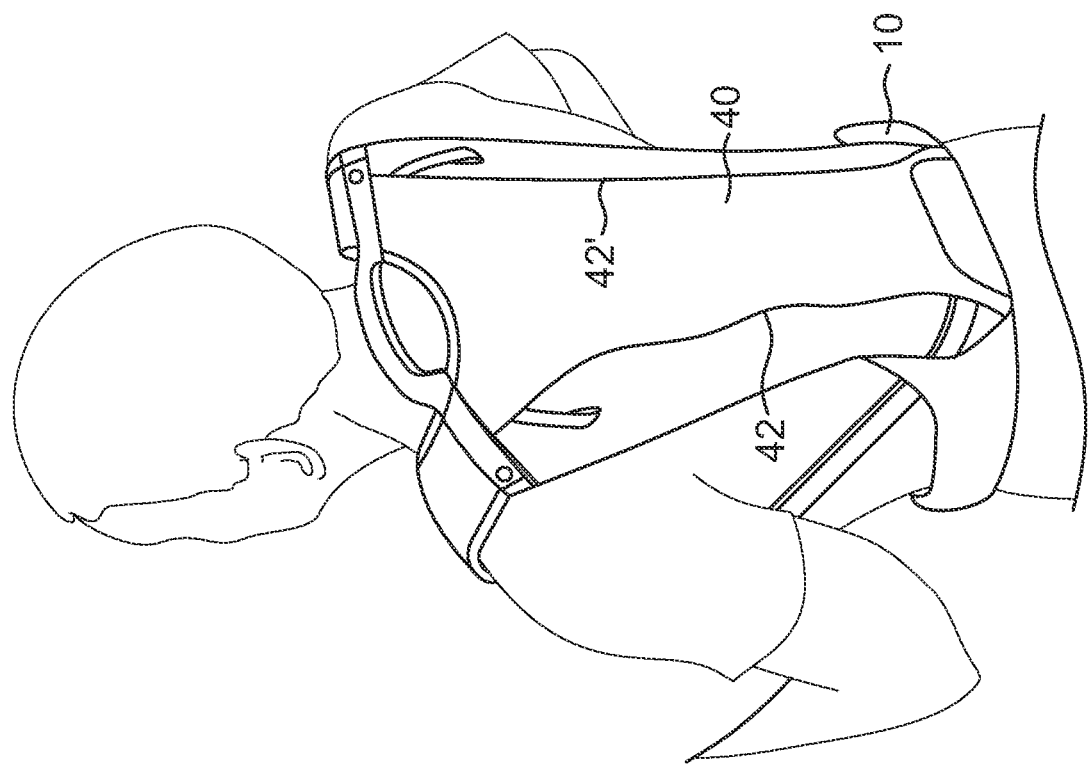
FIG. 15 shows a detail of the webbing.
Figure 16:
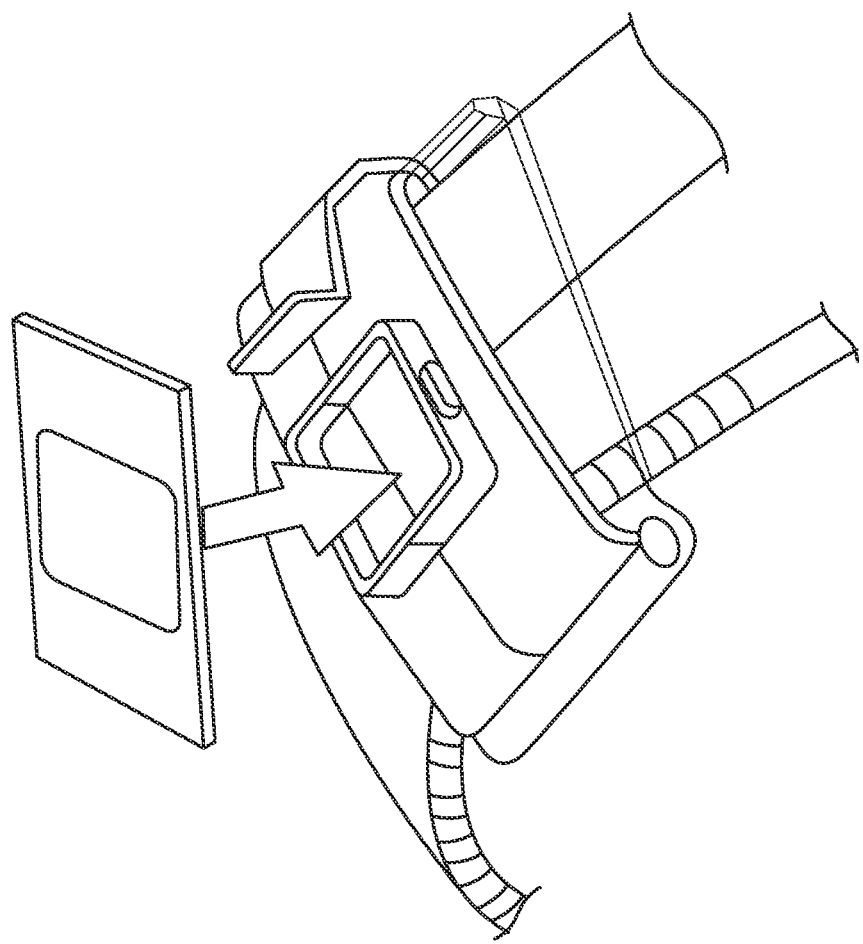
FIG. 16 shows webbing worn on a toolman, in which a tool support in folded condition is contained inside the webbing, and therefore not visible in this figure.

Thus, the user may wear the webbing with the tool support system concealed inside the cover 40, where the various elements are protected and do not snag onto structures outside the cover such as motor vehicle upholstery and the like. The user may move around comfortably without fear of injuring people or objects. Images of the cover that is closed to conceal the support system are shown for example in FIGS. 9, 10, 16.

FIG. 5 shows the arms 14, 14' in a partially deployed condition, having been moved a distance away from the frame 12. This movement causes the articulation pieces 15, 15' to commence rotating about rotation release catches 22, 22' towards a deployed condition shown in FIG. 6, in which the arms are able to extend horizontally over the shoulders of the user, where they may be used for supporting the gravity load of a tool. In aid of this movement, a special rotation release catches 22, 22' is provided to hold the structure in a horizontal fixed condition, until such time as the catches are released, allowing the arm and articulating element to pivot around the catch 22, 22'.

FIG. 7 is the same as FIG. 6, but shows the arms being moved toward the closed condition.

FIG. 8 shows the arms having been moved to the closed condition, which is equivalent to the starting condition shown in FIG. 4.

An additional feature of the invention includes a feature which allows a backpack 50 to be attached to the rear of the webbing and cover. The following figures show how, once the rig is stored inside the cover 40, a separate backpack 50 may be attached to the outside of the cover 40. This feature provides a compact and useful system for storing, carrying, and deploying a tool rig carried by a user, which solves many of the problems known in the art.

I claim:

1. A rig for supporting a tool comprising:
   webbing configured to be attached to a vertically oriented torso of a person;
   a rigid frame attached to the webbing, wherein the rigid frame includes a frame shaft that is oriented vertically and has a first elongate axis;
   a first connector, attached to the frame shaft and configured in relation to the frame shaft such that the first connector may swivel about the first elongate axis, whereby the first connector does not move further from, or closer to, the frame shaft when the first connector swivels about the first elongate axis;
   a first articulation piece having a first end and a second end opposite the first end, wherein the first end is attached to the first connector, and the first connector is configured in relation to the articulation piece so that the articulation piece may pivot about the first connector, whereby the articulation piece moves closer to, alternatively further from, the frame shaft when the articulation piece pivots about the first connector;
   a second connector attached to the second end of the articulation piece, wherein the second connector is configured in relation to the articulation piece so that the second connector is fixed to the articulation piece and does not rotate in relation to the articulation piece;
   an arm having a proximal end and a distal end opposite the proximal end, wherein:
      the arm, at a point of attachment adjacent the proximal end, is attached to the second connector;
      the second connector is configured in relation to the arm so that the arm may swivel about a second axis of the second connector, the second axis being perpendicular to the articulation piece and passing through the point of attachment with the arm, whereby swivel movement of the arm about the second axis allows an angle between the arm and the articulation piece when viewed from vertically above the deployed rig to be varied; and
      the second connector is further configured in relation to the arm so that the arm may pivot about the second connector in a plane that includes the arm, whereby the arm, when swiveled to lie in the same plane as the articulating piece, may be pivoted to move closer to, alternatively further from, the articulation piece;

whereby, the rig may assume configurations, including, in which the articulation piece may be oriented vertically, alternatively, horizontally, and, further whereby, the arm may be oriented vertically, alternatively, horizontally.

2. The rig of claim 1, wherein the first connector is configured to allow an angle of rotation to be selected and locked, alternatively, unlocked as desired.

3. The rig of claim 1, further comprising a cover attached to the webbing, the cover being configured to conceal the frame, the articulation piece, and the arm when in the collapsed condition.

4. The rig of claim 2, further comprising a backpack configured to attach to the webbing on the outside of the cover.

5. The rig of claim 1, further including a second articulation piece, wherein the first articulation piece is positioned on a first hand side of the rigid frame, and the second articulation piece is positioned on a second hand side of the rigid frame opposite the first hand side, further wherein, the second articulation piece has a first end and a second end opposite the first end, wherein the first end is attached to a third connector, and the third connector is configured in relation to the second articulation piece so that the articulation piece may pivot about the third connector, whereby the articulation piece moves closer to, alternatively further from, the rigid frame when the second articulation piece pivots about the third connector.

\* \* \* \* \*